US009377482B2

(12) United States Patent
Comi et al.

(10) Patent No.: US 9,377,482 B2
(45) Date of Patent: Jun. 28, 2016

(54) DETECTION STRUCTURE FOR A Z-AXIS RESONANT ACCELEROMETER

(71) Applicant: STMicroelectronics S.r.l., Agrate Brianza (IT)

(72) Inventors: Claudia Comi, Milan (IT); Alberto Corigliano, Milan (IT); Sarah Zerbini, Fontanellato (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 196 days.

(21) Appl. No.: 14/193,981

(22) Filed: Feb. 28, 2014

(65) Prior Publication Data

US 2014/0174183 A1    Jun. 26, 2014

Related U.S. Application Data

(63) Continuation of application No. PCT/IB2012/054497, filed on Aug. 31, 2012.

(30) Foreign Application Priority Data

Aug. 31, 2011    (IT) .............................. TO2011A0782

(51) Int. Cl.
   *G01P 15/097*    (2006.01)
(52) U.S. Cl.
   CPC ........... *G01P 15/0975* (2013.01); *G01P 15/097* (2013.01)
(58) Field of Classification Search
   CPC ................................................... G01P 15/097

USPC ....................................................... 73/514.29
See application file for complete search history.

(56) References Cited

U.S. PATENT DOCUMENTS

| 4,736,629 | A | * | 4/1988 | Cole | ..................... G01P 15/125 324/661 |
| 5,962,786 | A | | 10/1999 | Le Traon et al. | |
| 8,555,719 | B2 | * | 10/2013 | McNeil | ................. G01P 15/125 73/514.32 |
| 2003/0172753 | A1 | | 9/2003 | Geen | |
| 2006/0197411 | A1 | | 9/2006 | Hoen et al. | |

OTHER PUBLICATIONS

Burns et al., "Resonant Microbeam Accelerometers," *The 8th International Conference on Solid-State Sensors and Actuators, and Eurosensors IX*, Stockholm, Sweden, Jun. 25-29, 1995, pp. 659-662.

(Continued)

*Primary Examiner* — John Chapman, Jr.
(74) *Attorney, Agent, or Firm* — Seed IP Law Group PLLC

(57) ABSTRACT

A detection structure for a z-axis resonant accelerometer is provided with an inertial mass anchored to a substrate by means of elastic anchorage elements so as to be suspended above the substrate and perform an inertial movement of rotation about a first axis of rotation belonging to a plane of main extension of the inertial mass, in response to an external acceleration acting along a vertical axis transverse with respect to the plane; and a first resonator element and a second resonator element, which are mechanically coupled to the inertial mass by respective elastic supporting elements, which enable a movement of rotation about a second axis of rotation and a third axis of rotation, in a resonance condition. In particular, the second axis of rotation and the third axis of rotation are parallel to one another, and are moreover parallel to the first axis of rotation of the inertial mass.

25 Claims, 4 Drawing Sheets

(56) References Cited

OTHER PUBLICATIONS

Comi et al., "A New Out-of-Plane Resonant Micro Accelerometer," *2011 XX Congresso dell'Associazione Italiana di Meccanica Teorica e Applicata*, Bologna, Italy, Sep. 12-15, 2011, 7 pages.

Kim et al., "Inertial-Grade Out-of-Plane and In-Plane Differential Resonant Silicon Accelerometers (DRXLs)," *The 13th International Conference on Solid-State Sensors, Actuators and Microsystems*, Seoul, Korea, Jun. 5-9, 2005, pp. 172-175.

Lee et al., "A Vacuum Packaged Differential Resonant Accelerometer Using Gap Sensitive Electrostatic Stiffness Changing Effect," *The 13th Annual International Conference on Micro Electro Mechanical Systems*, Jan. 23-27, 2000, pp. 352-357.

Sung et al., "Development and test of MEMS accelerometer with self-sustatined oscillation loop," *Sensors and Actuators A 109*:1-8, 2003.

Zhu et al., "A Novel Resonant Accelerometer Based on Nanoelectromechanical Oscillator," *2010 IEEE 23rd International Conference on Micro Electro Mechanical Systems (MEMS)*, Jan. 24-28, 2010, pp. 440-443.

Comi et al., "A resonant micro accelerometer based on electrostatic stiffness variation," *Meccanica 48*:1893-1900, 2013.

\* cited by examiner

DETECTION STRUCTURE FOR A Z-AXIS RESONANT ACCELEROMETER

BACKGROUND

1. Technical Field

The present disclosure relates to an improved detection structure for a resonant accelerometer with vertical axis (so-called "z-axis"), of a MEMS (microelectromechanical system) or NEMS (nanoelectromechanical system) type, in particular one capable of detecting with high electrical performance a component of vertical acceleration, acting in a direction transverse with respect to, or out of, a plane of a main extension of the same structure.

2. Description of the Related Art

As is known, accelerometers of a MEMS (or NEMS) type have been proposed and used, thanks to their extremely compact dimensions, low consumption levels, and good electrical performance, for a wide range of fields of application, for example for inertial navigation applications.

The various accelerometers proposed in the literature and currently present on the market may be generally grouped into three classes, based on the principle of detection used by the corresponding detection structure: capacitive accelerometers, piezoresistive accelerometers, and resonant accelerometers.

In resonant accelerometers, the external acceleration to be measured produces a detectable shift of the resonance frequency of one or more resonator elements of the mechanical detection structure; the resonator element can be constituted by an entire inertial mass (free mass or proof mass) of the detection structure, or by some part thereof. Resonant detection, as compared to other measuring principles, has the advantage of offering a direct frequency output, of a quasi-digital type, high-sensitivity, and wide-dynamic-range.

According to the configuration of the detection structure, the variation of resonance frequency may be induced by the presence of axial stresses in the resonator element or by the variation of the so-called "electrical stiffness" to which the same resonator element is subjected.

In particular, z-axis resonant accelerometers have been proposed, made using the "surface micromachining" technique, whose operating principle is based on the detection of a resonance frequency variation due to a variation of electrical stiffness.

For instance, accelerometers of this sort are described in the following documents:

[1] S. Sung, J. G. Lee, T. Kang, "Development and test of MEMS accelerometer with self-sustained oscillation loop", *Sensors and Actuators,* 109, 1-8 (2003);

[2] B. Lee, C. Oh, S. Lee, Y. Oh, K. Chun, "A vacuum packaged differential resonant accelerometer using gap sensitive electrostatic stiffness changing effect", *Proc. MEMS* 2000;

[3] H. C. Kim, S. Seok, I. Kim, S-D. Choi, K. Chun, "Inertial-grade out-of-plane and in-plane differential resonant silicon accelerometers (DRXLs)", *Proc. Transducers '05, Seoul, Korea,* Jun. 5-9, 172-175 (2005).

The operating principle of these resonant accelerometers may be summarized as follows: an external acceleration a generates on an inertial mass m of the detection structure an inertial force F=m·a; this external force induces a displacement or a rotation of the inertial mass, proportional thereto, which causes variation of the distance or gap between the inertial mass and the substrate facing it (and detection electrodes provided on the same substrate). The gap variation produces a variation of electrical stiffness $K_e$, and this causes a corresponding variation of the resonance frequency of the resonating element, whether this is constituted by the entire inertial mass, by a part thereof, or by a distinct element coupled thereto.

In particular, the accelerometer based upon this principle proposed in document [1] uses as resonator element the entire inertial mass of the detection structure, suitably suspended above the substrate by means of elastic supporting elements, set at the edges of the same inertial mass, and appropriately kept in a condition of resonance by an electronics coupled thereto.

This structure has, however, the disadvantage that, since the detection axis coincides with the axis of oscillation of the resonant mass, it is difficult to check whether the resonant mode is stable; moreover, given the dimensions of the resonant mass (which corresponds to the entire inertial mass), the amount of energy required to drive it in resonance may in general be high.

An alternative solution is represented by the accelerometers proposed in the documents designated previously by [2] and [3], where the microelectromechanical detection structure is constituted by an inertial mass and by two torsional resonators coupled thereto. The inertial mass is constrained to the substrate eccentrically, and is set in rotation about a rotation axis in the presence of an external acceleration; the torsional resonators have an axis of rotation of their own, orthogonal to that of the inertial mass, and are separately kept in resonance. The displacement of the inertial mass causes variation of the electrical stiffness felt by the resonators, and hence a variation of the resonance frequency thereof.

The sensitivity reported in the literature for resonant accelerometers made by surface micromachining are of a few tens of hertz for 1 g of acceleration. For example, in the case of the device described in document [2], the sensitivity reaches approximately 70 Hz/g with overall dimensions of the mobile inertial mass of approximately 2.5 mm×2 mm, with a thickness of 40 μm (i.e., dimensions that are rather large, above all in the case of portable applications). In the case of the device described in document [1], the sensitivity reaches approximately 25 Hz/g with overall dimensions of the mobile inertial mass of approximately 1 mm×1 mm, with a thickness of 40 μm.

The various resonant MEMS accelerometers so far proposed hence differ from the standpoint of the arrangements provided for the mechanical detection structure (in particular, from the standpoint of the different arrangements of the resonator elements with respect to the inertial mass), and consequently from the standpoint of the electrical characteristics that derive therefrom, in particular as regards the detection sensitivity to the external acceleration.

None of these accelerometers is, however, completely satisfactory as regards the electrical characteristics and mechanical dimensions, mainly in the case of portable applications in which particularly low consumption levels and small dimensions are required.

BRIEF SUMMARY

The present disclosure is directed to providing a detection structure for a resonant accelerometer, having improved mechanical and electrical characteristics, in particular as regards the sensitivity in detection of the external acceleration and as regards the resulting dimensions.

One embodiment of the present disclosure is directed to a detection structure for a z-axis resonant accelerometer that includes a substrate, elastic anchorage elements, an inertial mass anchored to the substrate by the elastic anchorage elements and suspended above said substrate, said elastic elements being configured to enable said inertial mass to perform an inertial movement of rotation about a first axis of rotation parallel to a horizontal axis belonging to a plane of main extension of said inertial mass, in response to an external acceleration acting along a vertical axis transverse with respect to said plane. The detection structure also includes first and second elastic supporting elements and a first resonator element and a second resonator element, mechanically coupled to said inertial mass by the first and second elastic supporting elements, respectively, said elastic supporting elements being configured to enable a movement of rotation of said first resonator element and second resonator element respectively about a second axis of rotation and a third axis of rotation, respectively, said second axis of rotation and third axis of rotation being parallel to one another, and parallel to the first axis of rotation of said inertial mass.

BRIEF DESCRIPTION OF THE SEVERAL VIEWS OF THE DRAWINGS

For a better understanding of the present disclosure, preferred embodiments thereof are now described, purely by way of non-limiting example and with reference to the attached drawings, wherein.

DETAILED DESCRIPTION

Figure 1:
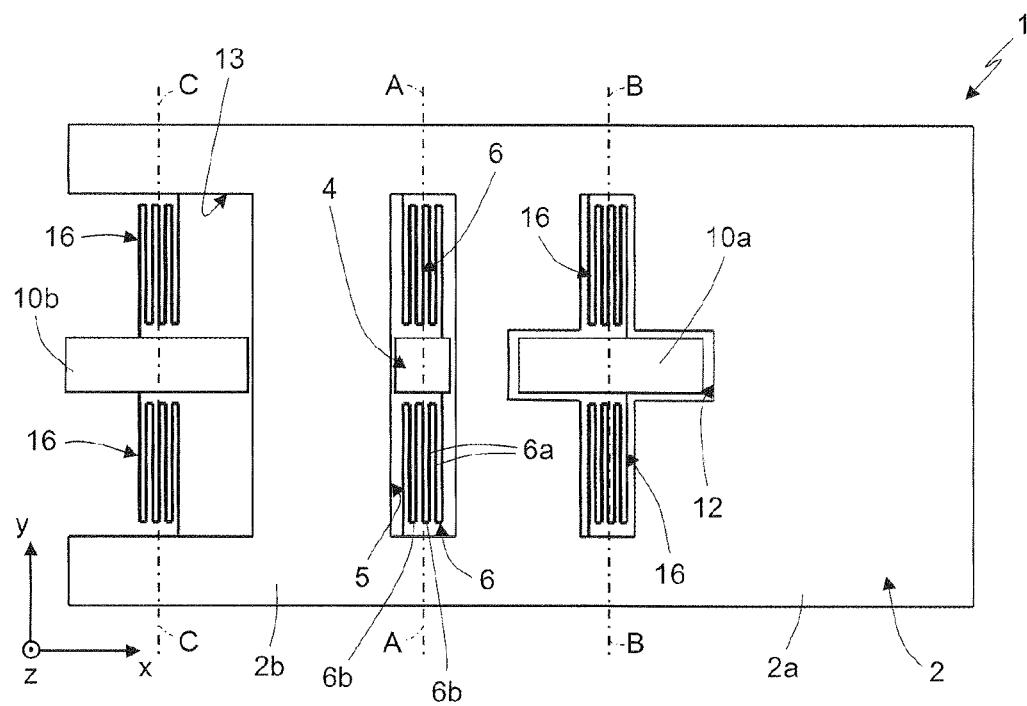
FIG. 1 shows a schematic plan view of a detection structure of a resonant accelerometer, according to a first embodiment of the present disclosure.

FIG. 1 shows a first embodiment of a microelectromechanical detection structure, designated as a whole by 1, of a z-axis resonant accelerometer. The detection structure 1 is made in an integrated manner, with semiconductor surface micromachining techniques, in particular starting from a body of semiconductor material (such as silicon).

The detection structure 1 comprises a single inertial mass 2, which has a generically rectangular shape in a plane xy, corresponding to a plane of main extension thereof, defined by a first horizontal axis x and a second horizontal axis y; the inertial mass 2 has a substantially negligible dimension (with respect to the dimensions in the plane xy) in a direction orthogonal to the same plane xy, along a vertical axis z defining a set of three orthogonal axes with the aforesaid first and second horizontal axes x, y. The vertical axis z moreover defines the direction of detection of the external acceleration by the detection structure 1.

The inertial mass 2 is anchored to an underlying substrate (not illustrated herein, for example a substrate of semiconductor material, such as silicon) so as to be suspended above said substrate, with the plane xy substantially parallel to a top surface of the substrate, in a resting condition (i.e., in the absence of any external acceleration).

In particular, the inertial mass 2 is elastically coupled to a single central anchorage 4 set within the overall dimensions of the same inertial mass 2 in the plane xy. The central anchorage 4 is for example constituted by a pillar that extends vertically as far as the substrate and is mechanically connected thereto. In particular, the central anchorage 4 is set in a first window 5, which is provided within the inertial mass 2 and traverses it throughout the thickness thereof.

Figure 2A:
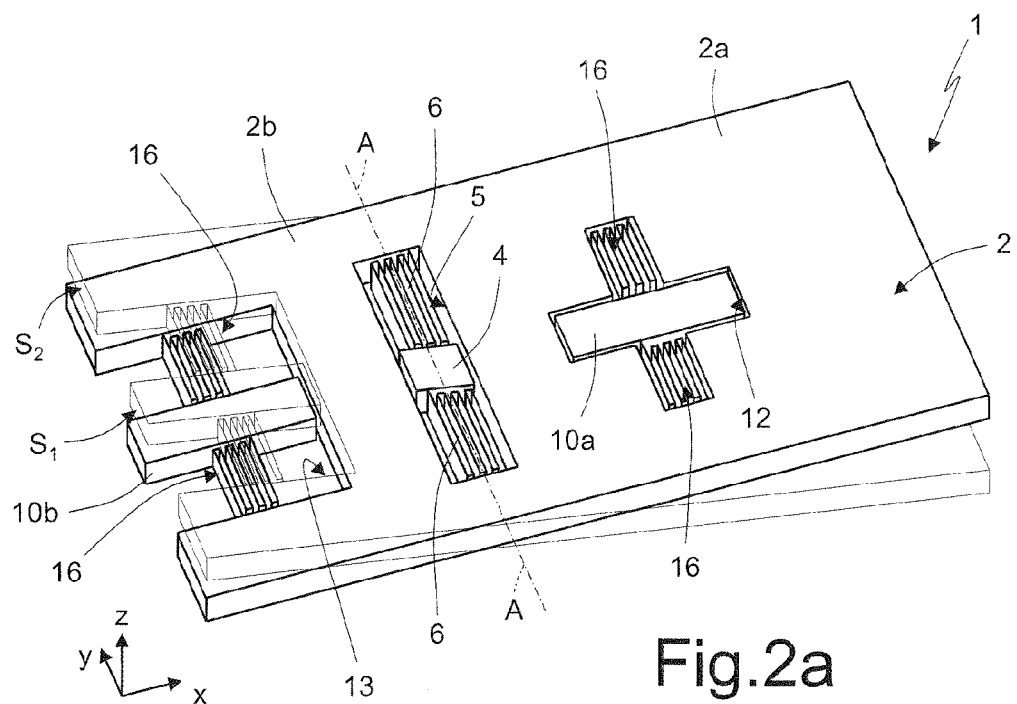
FIG. 2a shows the rotation of an inertial mass of the detection structure of FIG. 1 due to an external vertical acceleration.

The inertial mass 2 is connected to the aforesaid central anchorage 4 by means of elastic anchorage elements 6 (two in number in the embodiment illustrated in FIG. 1), as a whole configured (in particular, in terms of flexural and torsional stiffness) so as to keep the inertial mass 2 suspended above the substrate and enable a movement of rotation thereof out of the plane xy, about a first axis of rotation A, substantially directed parallel to the second horizontal axis y and defined by the axis of extension of the same elastic anchorage elements 6. This movement represents the first normal mode of the inertial mass 2 and is illustrated schematically in FIG. 2a (where the line of smaller thickness represents the resting configuration).

In particular, the inertial mass 2 has a distribution of mass that is asymmetrical with respect to the first axis of rotation A in such a way as to be constrained eccentrically to the central anchorage 4. The inertial mass 2 has, in fact, an asymmetrical distribution of mass along the first horizontal axis x, with a first portion 2a, and a second portion 2b, set on opposite sides with respect to the first axis of rotation A, the first portion 2a having an extension along the first horizontal axis x greater than the second portion 2b. The entire detection structure 1 is substantially symmetrical with respect to a central axis of symmetry parallel to the first horizontal axis x (and passing through the central anchorage 4).

The elastic anchorage elements 6 are set substantially symmetrically with respect to the first axis of rotation A and extend aligned on opposite sides with respect to the central anchorage 4 along the second horizontal axis y.

In greater detail, each elastic anchorage element 6 comprises a torsional spring of a "folded beam" type, which extends generally along the second horizontal axis y and is constituted, in a known way, by a plurality of mutually parallel rectilinear portions 6a, having an extension along the second horizontal axis y, and connected one another at the corresponding ends by connecting portions 6b, which extend in a direction transverse to the rectilinear portions 6a along the first horizontal axis x (and have a longitudinal extension much smaller than the rectilinear portions 6a). The rectilinear portions 6a are moreover very thin (that is, they have a length in the direction of extension much greater than the corresponding width).

In particular, a first one of the rectilinear portions 6a, set more externally with respect to the axis of rotation A, is connected, at one end thereof, to the inertial mass 2 joining to an internal lateral surface of the inertial mass 2, facing the first opening 5, whereas a second one of the rectilinear portions 6a, which is also set externally and on the opposite side with respect to the same axis of rotation A, is connected to the central anchorage 4.

The detection structure 1 further comprises a first resonator element 10a and a second resonator element 10b, which are constituted by respective suspended masses (having dimensions much smaller than the inertial mass 2 in the plane xy), set on opposite sides of the central anchorage 4 with respect to the first axis of rotation A, symmetrically with respect to the same first axis of rotation A.

In the embodiment illustrated in FIG. 1, the first resonator element 10a is set within the inertial mass 2, in particular within a second window 12, provided through the first portion 2a of the inertial mass 2, while the second resonator element 10b is set in an external lateral position with respect to the inertial mass 2, within a third window 13, provided through the second portion 2b of the inertial mass 2. In particular, the second resonator element 10b is located at the maximum distance possible from the first axis of rotation A so that one of its outer lateral surfaces (designated by $S_1$ in FIG. 2a) is flush with and aligned along the second horizontal axis y with respect to a respective outer lateral surface of the inertial mass 2 (designated by $S_2$ in the same FIG. 2a). The third window 13 is hence open outwards, at the aforesaid outer lateral surface $S_2$ of the inertial mass 2.

Figure 2B:
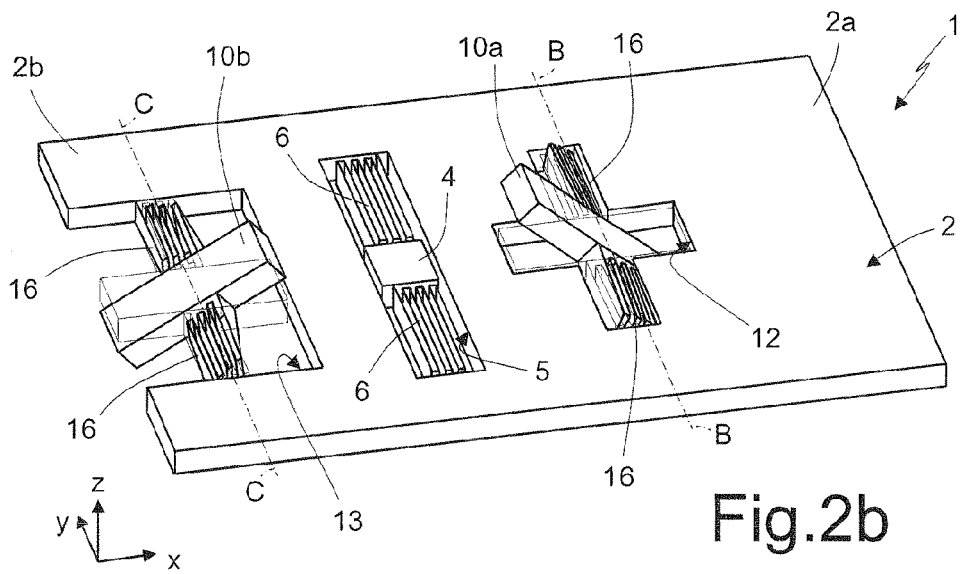
FIG. 2b shows the deformation of torsional resonators of the detection structure of FIG. 1.

The resonator elements 10a, 10b are elastically constrained to the inertial mass 2 by means of respective elastic supporting elements 16, of a torsional type, configured so as to enable the resonator elements to perform a movement of rotation out of the plane xy, about a respective second axis of rotation B and a respective third axis of rotation C, which are parallel to the first axis of rotation A and to the second horizontal axis y. This movement constitutes the first normal mode for the resonator elements 10a, 10b and is illustrated schematically in FIG. 2b (where once again a resting configuration is represented by a line of smaller thickness).

Figure 3A:
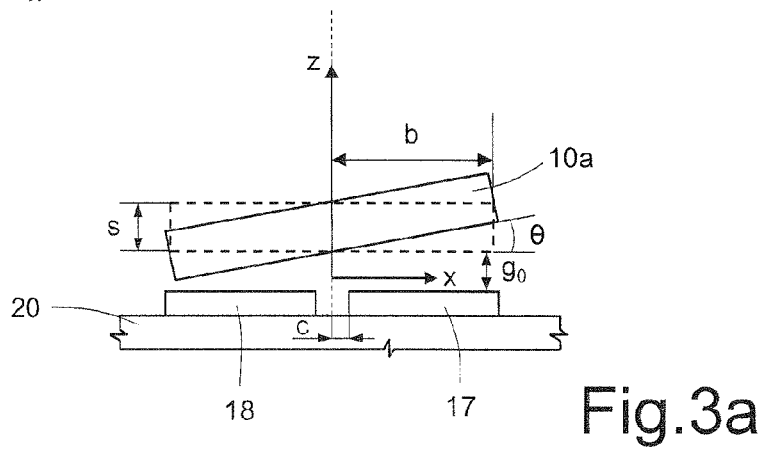
FIGS. 3a and 3b show schematically a lateral cross section of a resonator and, respectively, of the inertial mass of the detection structure of FIG. 1.
Figure 3B:
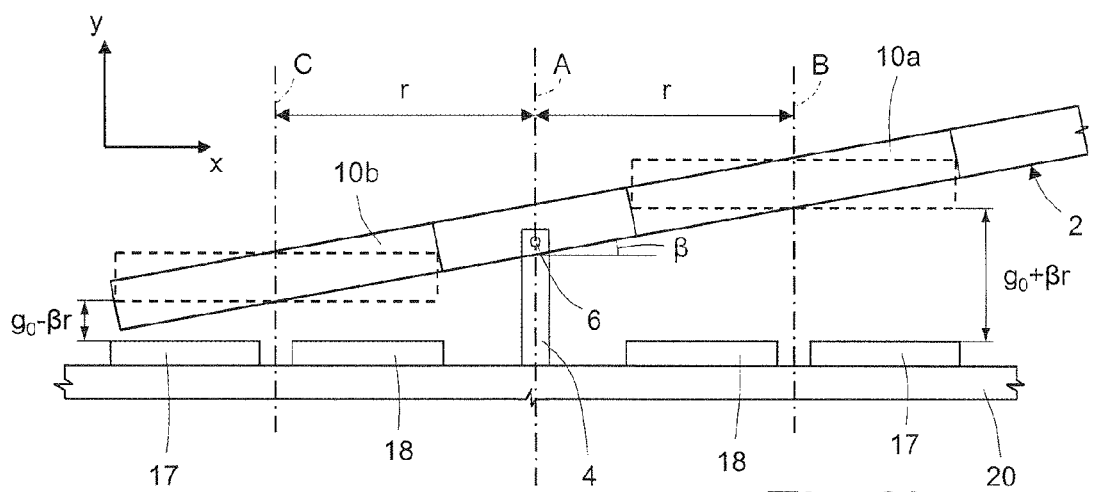

The axes of rotation B, C are set on opposite sides of the first axis of rotation A, symmetrically thereto at a distance r (indicated in FIG. 3b). This distance r is approximately equal to the difference between the extension of the second portion 2b of the inertial mass 2 along the first horizontal axis x and the half-extension of the mass of the resonator element 10b (designated by b in FIG. 3a) along the same axis x.

In greater detail, each resonator element 10a, 10b is constrained to the respective portion 2a, 2b of the inertial mass 2 by a pair of elastic supporting elements 16, which are constituted by torsion springs of a folded-beam type, which extend generally along the second horizontal axis y, on opposite sides of the respective resonator element 10a, 10b, substantially centrally with respect thereto (and are configured substantially as described in relation to the elastic anchorage elements 6). The elastic supporting elements 16 extend between the respective resonator element 10a, 10b and the inertial mass 2 within the windows 12, 13, which have an appropriate conformation (designed to contain both the overall dimensions of the resonator elements 10a, 10b and the overall dimensions of the elastic supporting elements 16).

With reference also to FIGS. 3a and 3b, the detection structure 1 further comprises, for each resonator element 10a, 10b, a pair of electrodes 17, 18, set underneath the corresponding resonator element 10a, 10b, on opposite sides with respect to the corresponding axis of rotation B, C. The electrodes 17 and 18 are set on the substrate of the detection structure 1, designated by 20 in the same FIGS. 3a, 3b.

A first electrode, defined as "driving electrode" 17, is used for driving the associated resonator element 10a, 10b into a condition of resonance by applying an appropriate electrical potential difference. In particular, the resonator element 10a, 10b is set at a constant biasing voltage $V_p$, whilst the associated driving electrode 17 is set at a time-varying driving voltage $V_a(t)$, for example with sinusoidal waveform, in such a way as to induce the oscillating rotational resonance movement of the resonator element 10a, 10b.

In particular, driving into resonance of the resonator elements 10a, 10b is induced continuously, irrespective of the rotation of the inertial mass 2 due to the presence of the external acceleration to be detected.

A second electrode, defined as "detection electrode" 18, is used for detecting, by means of a variation of the capacitive coupling with the resonator element 10a, 10b, variations of the corresponding resonance frequency (according to a detection scheme known as "parallel-plate detection"). The detection electrode 18 is generally kept at ground (0 V).

In particular, for the reasons that will be clarified hereinafter, the driving electrodes 17 are set in a lateral position more external with respect to the first axis of rotation A and to the overall dimensions of the inertial mass 2 in the plane xy.

In the same FIGS. 3a, 3b: c designates the distance along the first horizontal axis x between the axis of rotation B or C and the electrodes 17 and 18; b designates the half-extension of the resonator elements 10a, 10b along the same first horizontal axis x; $g_0$ designates the gap at rest (i.e., in the absence of driving and of external accelerations) between the electrodes 17, 18 and the corresponding resonator element 10a, 10b along the vertical axis z; θ designates the angle of rotation of the resonator element 10a, 10b about the respective axis of rotation B, C; and β designates the angle of rotation of the inertial mass 2 about the first axis of rotation A.

In a way not illustrated here (but that will be described hereinafter), appropriate electrical-connection paths are provided for electrical connection of the aforesaid electrodes 17, 18 to an electronic circuit coupled to the detection structure 1. This electronic circuit is configured so as to supply the electrical driving signals to the detection structure 1 and receive and process the electrical detection signals supplied by the same detection structure 1.

There now follows a description of the working principle of the detection structure 1, with reference once again to FIGS. 3a, 3b, which illustrate respectively: the rotation of a resonator element 10a, 10b (in particular, the first resonator element 10a) in response to the driving signal; and the rotation of the inertial mass 2 in response to an external acceleration $a_z$ acting along the vertical axis z (it may be noted that in FIG. 3b, the resonator elements 10a, 10b are shown in a resting condition, for simplicity of illustration, but it is understood that the resonance oscillation is in any case present, even in the presence of the external acceleration $a_z$).

In the absence of the external acceleration $a_z$, the two resonator elements 10a, 10b are kept in rotation at the same nominal frequency $f_0$ of oscillation, given by the following expression $$f_0 = \frac{1}{2\pi}\sqrt{\frac{K_m - K_e}{J_p}} \quad (1)$$

where $K_m$ and $J_p$ are, respectively, the mechanical torsional stiffness and the polar moment of inertia of the mass of the resonator elements 10a, 10b, and $K_e$ is their electrical torsional stiffness, given by the following expression $$K_e = \frac{2\varepsilon_0 L}{3g_0^3}V_p^2(b^3 - c^3) \quad (2)$$

where $\varepsilon_0$ is the dielectric constant of vacuum, and L is the dimension along the second horizontal axis y of the mass of the resonator elements 10a and 10b.

The torque $T_e$ due to the electrostatic attraction acting on each resonator element 10a, 10b for small angles θ and low driving voltages is moreover given by $$T_e \approx T_{e0} + K_e \theta \quad (3)$$

where $$T_{e0} = \frac{\varepsilon_0 L}{2g_0^2}(b^2 - c^2)V_p V_a \quad (4)$$

When the detection structure 1 is subject to a linear acceleration along the vertical axis z, the elastic anchorage elements 6 undergo torsional deformation, enabling rotation of the inertial mass 2 out of the plane xy, about the first axis of rotation A.

As a result of this rotation, as highlighted in FIG. 3b, the resonator elements 10a, 10b, constrained to the inertial mass 2, undergo a corresponding displacement along the vertical axis z, and in particular a first resonator element, for example the first resonator element 10a, moves away from the substrate 20 (and from the electrodes 17, 18 set thereon), whereas the other resonator element, in particular the second resonator element 10b, approaches the substrate 20.

The average distance at rest between the first resonator element 10a and the substrate 20 (and the electrodes 17, 18 set thereon) becomes approximately equal to $g_0+\beta r$, whilst the distance at rest between the second resonator element 10b and the same substrate 20 becomes approximately equal to $g_0-\beta r$ (note that for small displacements, the approximation $\sin \beta \approx \beta$ applies).

The electrical stiffness, present on account of the capacitive driving, is inversely proportional to the cube of the distance g between the resonator element 10a, 10b and the underlying driving electrode 17 and hence decreases for the first resonator element 10a, whereas it increases for the second resonator element 10b.

By means of Equation (1) it is possible to calculate the new resonance frequency $f_1$ of the first resonator element 10a, which has decreased, and the new resonance frequency $f_2$ of the second resonator element 10b, which has increased accordingly:

$$f_1 = \frac{1}{2\pi}\sqrt{\frac{K_m - \frac{2\varepsilon_0 L}{3(g_0+\beta r)^3}V_p^2(b^3-c^3)}{J_p}} \quad (5)$$

$$f_2 = \frac{1}{2\pi}\sqrt{\frac{K_m - \frac{2\varepsilon_0 L}{3(g_0-\beta r)^3}V_p^2(b^3-c^3)}{J_p}} \quad (6)$$

By combining the readings supplied by the two resonator elements 10a, 10b, in particular obtained via the corresponding detection electrodes 18, it is possible to determine, starting from the difference in the resonance frequencies $f_1$, $f_2$, the value of the external acceleration $a_z$ acting on the detection structure 1 in a vertical direction.

In particular, by combining the signals generated by the two resonator elements 10a, 10b, using the expressions (5) and (6) linearized about $f_0$, it is possible to determine the frequency variation $\Delta f$ $$\Delta f \approx f_0 \left[-\frac{g_0^3}{2(g_0+\beta r)^3} + \frac{g_0^3}{2(g_0-\beta r)^3}\right]\frac{K_e}{K_m-K_e} \approx f_0 \cdot 3 \cdot \frac{\beta r}{g_0} \cdot \frac{K_e}{K_m-K_3} \quad (7)$$

The angle of rotation $\beta$ can moreover be determined via the following expression $$\beta = \frac{3ma_z R_G}{2Gsw^3}n_r L_r \quad (8)$$

where $a_z$ is the external acceleration along the vertical axis z, $R_G$ is the distance of the center of mass of the inertial mass 2 from the first axis of rotation A, G is the elastic shear modulus, w and s are respectively the dimensions in the plane and out of the plane xy of the cross section of the elastic anchorage elements 6, and $n_r$ and $L_r$ are, respectively, the number of folds and the length of each rectilinear portion 6a of the elastic anchorage elements 6.

By means of the expressions (7) and (8) it is hence possible to obtain the sensitivity of the detection structure 1, as $$\frac{\Delta f}{a_z} \approx f_0 9 \frac{mR_G}{2Gsw^3 g_0}n_r L_r r \cdot \frac{K_e}{K_m-K_e} \quad (9)$$

Figure 4:
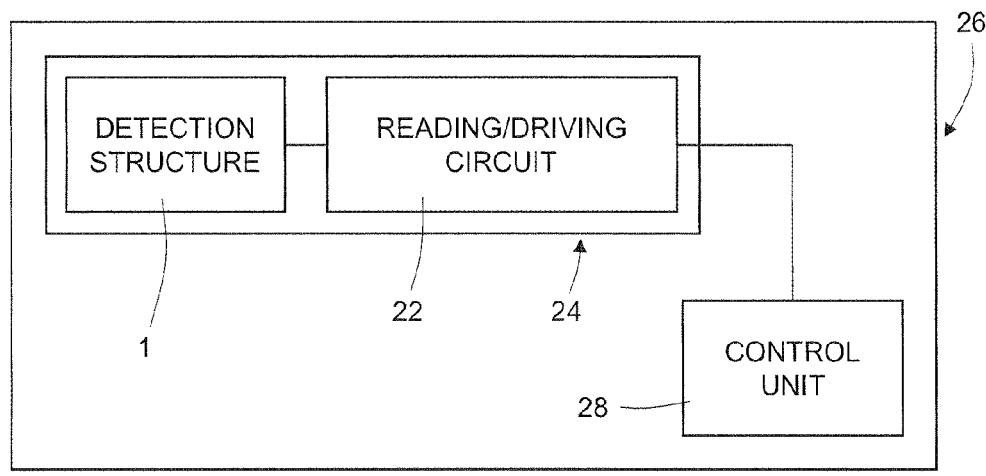
FIG. 4 is a simplified block diagram of a resonant accelerometer incorporating the detection structure, and of an electronic apparatus provided with the resonant accelerometer.

As is shown in FIG. 4, the detection structure 1 is conveniently coupled to an appropriate electronic reading and driving circuit 22, configured, inter alia, to carry out appropriate processing operations and combinations of the values of resonance frequency $f_1$, $f_2$ (in particular, the difference of these values) in order to determine the value of the external acceleration $a_z$.

The detection structure 1 and the associated electronic reading and driving circuit 22 form together a z-axis resonant accelerometer 24; the electronic reading circuit 22 is conveniently provided in integrated manner as ASIC (Application-Specific Integrated Circuit) in a die, which may advantageously be housed in one and the same package that also houses the die in which the detection structure 1 is provided.

As shown schematically in the same FIG. 4, an electronic apparatus 26, provided with resonant accelerometer 24, for example a portable apparatus, such as a laptop, a palmtop, or a photographic camera or video camera, further comprises a control unit 28 (for example, a microprocessor control unit), electrically connected to the electronic reading and driving circuit 22 so as to receive the acceleration measurements for carrying out control operations for management of the electronic apparatus 26.

It is emphasized that the presence of the two resonator elements 10a, 10b subjected to opposite variations of the resonance frequency affords various advantages, amongst which:

the sensitivity in the detection of the external acceleration is doubled by measuring the difference between the frequencies of the two resonator elements, instead of the variation of frequency of a single resonator element;

the linearity of the system is improved, i.e., the response of the accelerometer can be linearized in a wider range of accelerations; and the geometry described is less sensitive to the spurious effects of the thermal load given that, when the difference between the frequencies is considered, a non-elastic effect that causes a pre-stressing in the resonator elements is removed.

Figure 5:
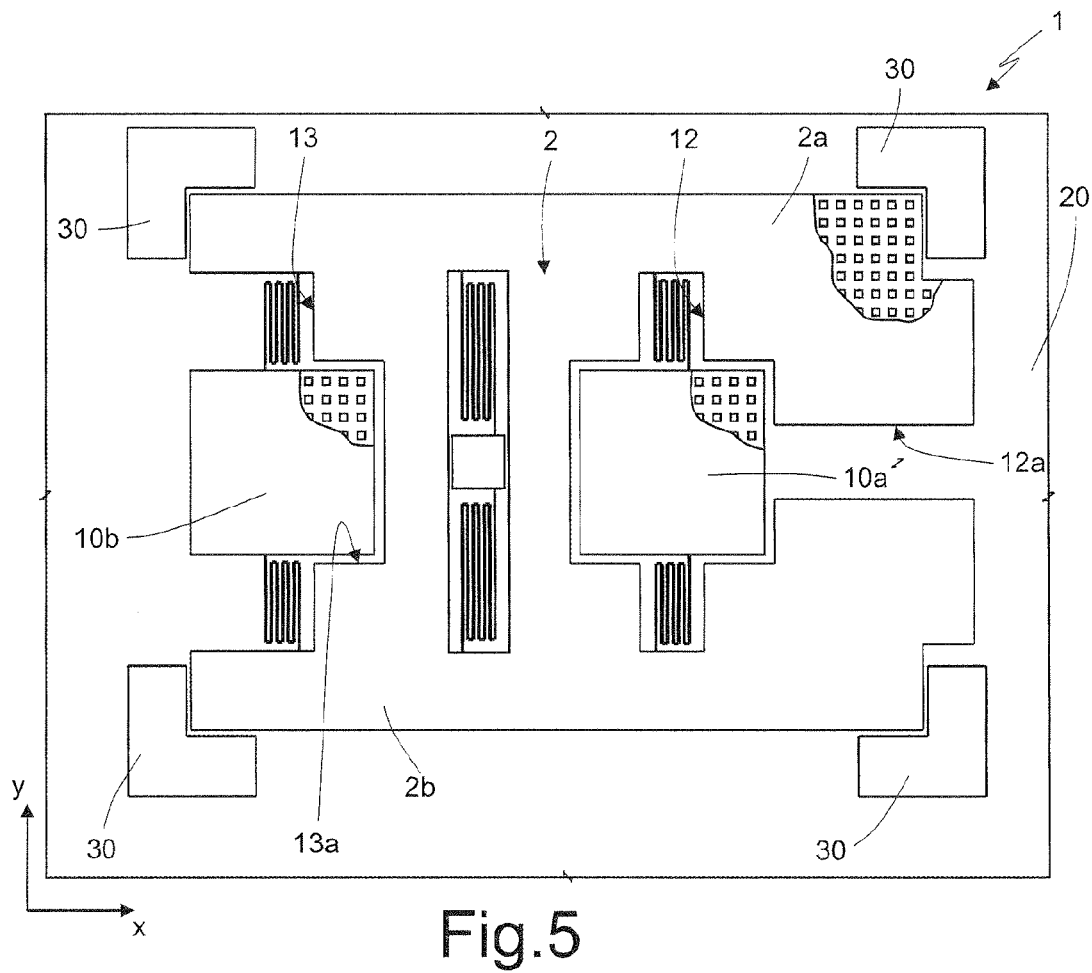
FIG. 5 is a more detailed top plan view of a detection structure of a resonant accelerometer, according to a further embodiment of the present disclosure.
Figure 6:
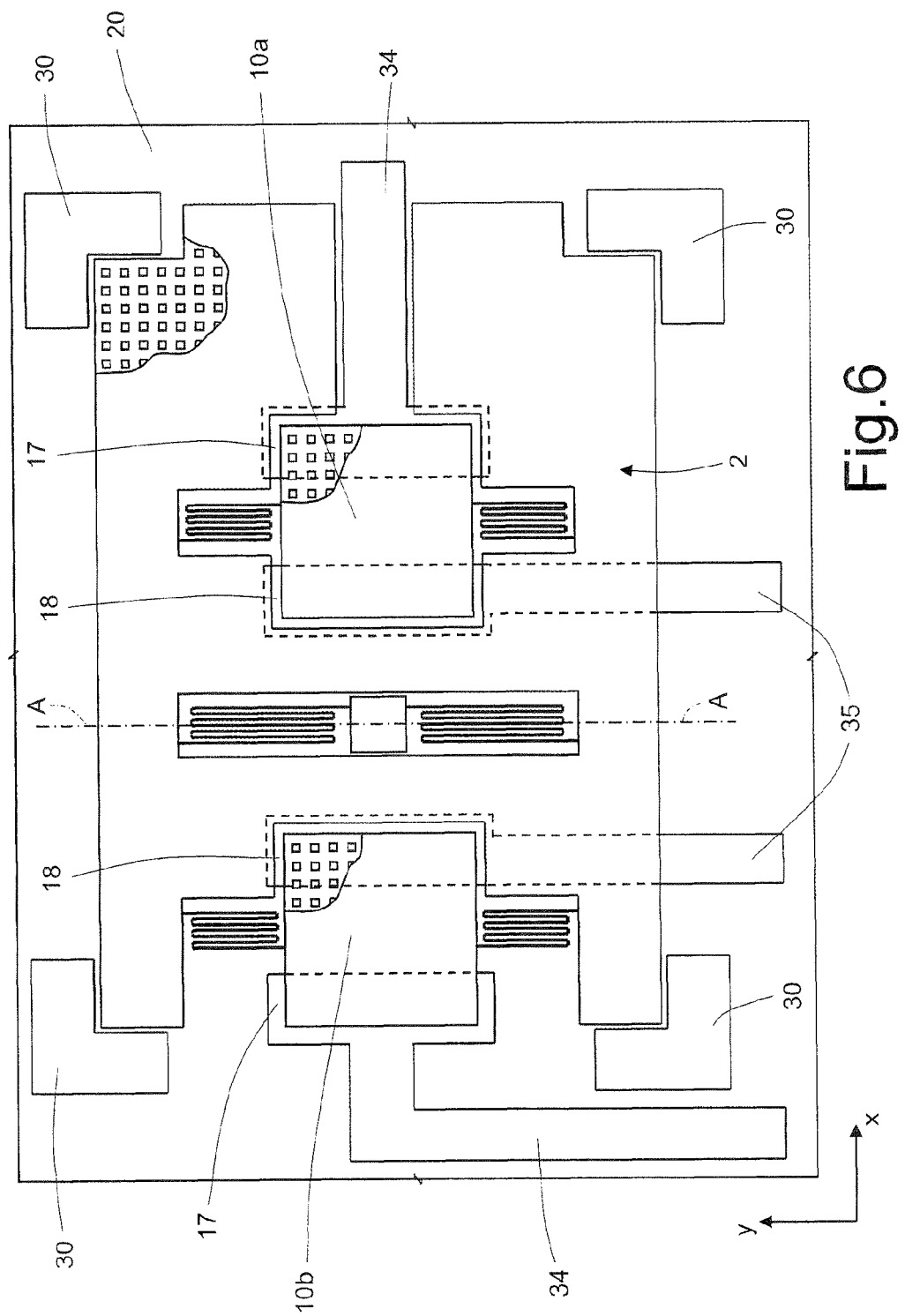
FIG. 6 is a top plan view of the detection structure of FIG. 5, with electrical-connection tracks shown.

FIGS. 5 and 6 are more detailed top plan views of a particular embodiment of the detection structure, again designated by 1, where it is possible to note, among other features, the presence of holes made throughout the thickness of the inertial mass 2 and of the resonator elements 10a, 10b in order to enable their release with respect to the substrate 20 by chemical etching of underlying regions of material.

Stopper elements (stoppers) 30 may also be noted, set at the corners of the inertial mass 2 in order to limit the range of spurious movements of the inertial mass 2 in the plane xy. These stoppers 30 are conveniently anchored to the substrate 20, and are able to stop the movement of the inertial mass 2 prior to possible failure.

In this embodiment, the resonator elements 10a, 10b are constituted by respective suspended masses having a substantially square shape in plan view.

Furthermore, also the second window 12 is in this case open outwards, having a prolongation portion 12a that extends from the mass of the first resonator element 10a towards the outside of the inertial mass 2, traversing entirely part of the first portion 2a of the inertial mass 2 parallel to the first horizontal axis x. The third window 13 defines, instead, a recess 13a in the second portion 2b of the inertial mass 2, for accommodating part of the second resonator element 10b and for enabling formation and the proper arrangement of the elastic supporting elements 16.

As more clearly shown in FIG. 6, this geometrical configuration enables first electrical tracks towards the driving electrodes 17 (which are for this purpose advantageously set on the outside of the detection structure 1 with respect to the first axis of rotation A), designated by 34, to follow a path that does not pass underneath the inertial mass 2 so as to prevent any undesirable movements thereof due to the electrical driving quantities. Furthermore, both the first electrical tracks 34 towards the driving electrodes 17 and second electrical tracks towards the detection electrodes 18, designated by 35, are advantageously substantially symmetrical with respect to the first axis of rotation A.

In a known manner, the first and second electrical tracks 34, 35 are provided on the substrate 20, from which they are insulated by appropriate dielectric material, and contact the electrodes 17, 18 (being, for example, obtained starting from one and the same layer of material, for example polysilicon).

The sensitivity to accelerations along the vertical axis z associated to the detection structure 1 shown in FIGS. 5 and 6, with a dimension of the inertial mass 2 of approximately 400 µm (along the first horizontal axis x)×300 µm (along the second horizontal axis y)×15 µm (along the vertical axis z) and a biasing voltage $V_p$ of 6 V is higher than 300 Hz/g; the dimensions of the resonator elements 10a, 10b are in this case 105 µm×105 µm with the same thickness of 15 µm, and the nominal resonance frequency is about 20 kHz.

As previously mentioned, the detection structure 1 may be obtained with processes of surface micromachining, for example using the so-called ThELMA (Thick Epipoly Layer for Microactuators and Accelerometers) process.

The ThELMA process enables formation of suspended structures with relatively contained thicknesses (for example, in the region of 10-15 µm), anchored to the substrate through compliant parts (springs) and consequently capable of displacing with respect to the underlying silicon substrate. The process consists of various manufacturing steps, amongst which:

thermal oxidation of the substrate;
deposition and patterning of horizontal electrical interconnections (to obtain for example, the electrodes 17, 18 and the electrical tracks 34, 35);
deposition and patterning of a sacrificial layer;
epitaxial growth of a structural layer (for example, made of polysilicon with a thickness of 15 µm, to form the suspended masses);
patterning of the structural layer by means of trench etching;
removal of the sacrificial oxide for release of the various suspended masses; and
deposition of contact metallizations.

From what has been described and illustrated above, the advantages that the present solution affords are evident.

In particular, the geometrical configuration proposed (for example, as regards the position of the resonator elements 10a, 10b with respect to the inertial mass 2), and the fact that the resonator elements 10a, 10b rotate about axes parallel to that of rotation of the inertial mass 2 enables a reduction in the overall dimensions of the detection structure 1.

The sensitivity of the accelerometer (measured as the variation of frequency per 1 g of external acceleration) that it is possible to obtain with the structure described is higher than what can be obtained with known structures, for example as described in documents [1], [2] and [3] cited previously, also given smaller overall dimensions.

In particular, in order to increase the sensitivity of detection while maintaining small dimensions, it is advantageous to position one of the resonator elements, in the examples illustrated the second resonator element 10b, laterally with respect to the inertial mass 2, at the maximum distance allowed by the overall dimensions of the same inertial mass 2 in the plane xy (without exceeding these overall dimensions). In general, the sensitivity of the accelerometer for linear accelerations increases in fact with the displacement out of the plane at a point corresponding to the two resonator elements 10a, 10b (and hence with the distance of the resonator elements 10a, 10b from the first axis of rotation A). On the other hand, this displacement is limited by the space existing between the substrate 20 and the inertial mass 2. The stiffnesses of the elastic elements and the dimensions of the inertial mass 2 are hence optimized, taking into account the typical gap of a given surface-micromachining process.

The electrical tracks 34, 35 required for actuation of the resonator elements and detection of the resonance frequency may moreover be set symmetrically with respect to the first axis of rotation A of the inertial mass 2 and it is possible to prevent the first electrical tracks 34, designed for actuation, from passing underneath the inertial mass, causing undesirable movements thereof due to the electrostatic attraction.

As compared to other MEMS resonant accelerometers proposed in the literature, the presence of two resonator elements subject to variations of frequency of opposite sign enables reading of the external acceleration even in the presence of a state of coaction generated, for example, by a thermal variation that may induce a non-planarity of the detection structure. The differential measurement itself increases also the range of linearity of acceleration detection.

Furthermore, it is advantageous, for example for questions of energy saving, for the resonant part of the detection structure 1 not to be constituted by the entire inertial mass 2 but only by the two resonator elements 10a, 10b, which are appropriately actuated by means of the driving electrodes 18 set underneath their mass.

In conclusion, it is clear that modifications and variations may be made to what has been described and illustrated herein, without thereby departing from the scope of the present disclosure.

In particular, it is evident that the geometrical shape of the detection structure 1, or of parts thereof, could differ from what has been described previously, without this entailing any relevant variations in the working principle.

Furthermore, the detection structure 1 could be of a nanoelectromechanical type in the case of use of adequate manufacturing methods that envisage achievement of submicrometric dimensions.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A detection structure for a z-axis resonant accelerometer, comprising:
    a substrate;
    elastic anchorage elements;
    an inertial mass anchored to the substrate by the elastic anchorage elements and suspended above said substrate, said elastic elements being configured to enable said inertial mass to perform an inertial movement of rotation about a first axis of rotation parallel to a horizontal axis belonging to a plane of main extension of said inertial mass, in response to an external acceleration acting along a vertical axis transverse with respect to said plane;
    first and second elastic supporting elements;
    a first resonator element and a second resonator element, mechanically coupled to said inertial mass by the first and second elastic supporting elements, respectively, said elastic supporting elements being configured to enable a movement of rotation of said first resonator element and second resonator element respectively about a second axis of rotation and a third axis of rotation, respectively, said second axis of rotation and third axis of rotation being parallel to one another, and parallel to the first axis of rotation of said inertial mass;
    driving elements coupled to said first resonator element and second resonator element, the driving elements including driving electrodes formed on said substrate and set underneath, and capacitively coupled to, each of said first and second resonator elements; and
    first electrical-conduction paths formed on said substrate, the first electrical-conduction paths being configured to contact said driving electrodes, said first electrical-conduction paths not being set underneath said inertial mass.

2. The structure according to claim 1 wherein said second resonator element is positioned externally from said inertial mass.

3. The structure according to claim 1 wherein the inertial mass has a first window, the substrate including:
    a central anchor, positioned in the first window, said elastic anchorage elements coupling to said inertial mass to the central anchor in the first window, and extending along said first axis of rotation, said inertial mass having a distribution of mass asymmetrical with respect to said first axis of rotation and being constrained eccentrically to said substrate.

4. The structure according to claim 3 wherein the inertial mass has second and third windows and an outer lateral surface, said first resonator element is positioned in the second window, and said second resonator element is positioned in the third window;
    said third window faces outside of said inertial mass; and
    said second resonator element has an outer lateral surface flush with and aligned along said horizontal axis with respect to the outer lateral surface of said inertial mass.

5. The structure according to claim 4 wherein said second resonator element is at a maximum distance possible from said first axis of rotation while remaining within outer dimensions of said inertial mass in said plane.

6. The structure according to claim 3 wherein the driving elements are configured to enable resonance driving in rotation about said second axis of rotation and third axis of rotation, respectively.

7. The structure according to claim 1 wherein said first resonator element and said second resonator element are positioned symmetrically with respect to said first axis of rotation, said second axis of rotation and said third axis of rotation being positioned at an equal distance from said first axis of rotation.

8. The structure according to claim 1 wherein said elastic anchorage elements and said first and second elastic supporting elements are folded-beam torsional springs having a main extension along said horizontal axis.

9. The structure according to claim 1 wherein the inertial mass has second and third windows facing outside of said inertial mass;
    said first and second resonator elements are set, respectively, in the second and third windows;
    said driving electrodes and at least part of said first electrical-conduction paths are positioned to correspond with said second and third windows.

10. The structure according to claim 1, further comprising first and second detection electrodes, formed on said substrate and set underneath, and respectively capacitively coupled to, said first and second resonator elements; said detection electrodes being configured to enable detection of a variation of resonance frequencies of said first and second resonator elements as a consequence of the inertial movement of said inertial mass about said first axis of rotation.

11. The structure according to claim 10, further comprising second electrical-conduction paths formed on said substrate and configured to contact said detection electrodes; wherein said second electrical-conduction paths are set symmetrically with respect to said first axis of rotation.

12. A resonant accelerometer, comprising:
    a detection structure configured to detect a component of external linear acceleration directed along a vertical axis, the detection structure including:
        a substrate;
        elastic anchorage elements;
        an inertial mass having first and second windows and a first outer lateral surface, said second window facing outside of said inertial mass, the inertial mass being anchored to the substrate by the elastic anchorage elements and suspended above said substrate, said elastic elements being configured to enable said inertial mass to perform an inertial movement of rotation about a first axis of rotation parallel to a horizontal axis belonging to a plane of main extension of said inertial mass, in response to an external acceleration acting along the vertical axis that is transverse with respect to said plane;
        first and second elastic supporting elements; and
        a first resonator element positioned in the first window and a second resonator element positioned in the second window, said second resonator element having a second outer lateral surface flush with and aligned along said horizontal axis with respect to said first outer lateral surface of said inertial mass, said first and second resonator elements being mechanically coupled to said inertial mass by the first and second elastic supporting elements, respectively, said elastic supporting elements being configured to enable a movement of rotation of said first resonator element and second resonator element, respectively about a second axis of rotation and a third axis of rotation, respectively, said second axis of rotation and third axis of rotation being parallel to one another, and parallel to the first axis of rotation of said inertial mass.

13. The accelerometer according to claim 12, further comprising a reading and driving circuit electrically coupled to said detection structure.

14. The accelerometer according to claim 12 wherein the inertial mass has a third window, the substrate including:
a central anchor, positioned in the third window, said elastic anchorage elements coupling to said inertial mass to the central anchor in the third window, and extending along said first axis of rotation, said inertial mass having a distribution of mass asymmetrical with respect to said first axis of rotation and being constrained eccentrically to said substrate.

15. The accelerometer according to claim 12 wherein said second resonator element is set in an external lateral position with respect to an overall dimension of said inertial mass in said plane.

16. The accelerometer according to claim 12 wherein said first resonator element and said second resonator element are positioned symmetrically with respect to said first axis of rotation, said second axis of rotation and said third axis of rotation being positioned at an equal distance from said first axis of rotation.

17. An electronic apparatus, comprising:
a control unit; and
a resonant accelerometer coupled to the control unit, the accelerometer including:
a detection structure configured to detect a component of external linear acceleration directed along a vertical axis, the detection structure including:
a substrate;
elastic anchorage elements;
an inertial mass having first and second windows and a first outer lateral surface, the inertial mass being anchored to the substrate by the elastic anchorage elements and suspended above said substrate, said elastic elements being configured to enable said inertial mass to perform an inertial movement of rotation about a first axis of rotation parallel to a horizontal axis belonging to a plane of main extension of said inertial mass, in response to an external acceleration acting along the vertical axis that is transverse with respect to said plane;
first and second elastic supporting elements; and
a first resonator element positioned in the first window and a second resonator element positioned in the second window, said second resonator element having a second outer lateral surface aligned with the first outer lateral surface of said inertial mass, said first and second resonator elements being mechanically coupled to said inertial mass by the first and second elastic supporting elements, respectively, said elastic supporting elements being configured to enable a movement of rotation of said first resonator element and second resonator element, respectively about a second axis of rotation and a third axis of rotation, respectively, said second axis of rotation and third axis of rotation being parallel to one another, and parallel to the first axis of rotation of said inertial mass;
a reading circuit coupled to the accelerometer; and
a driving circuit coupled to the accelerometer.

18. The apparatus according to claim 17 wherein the inertial mass has a third window, the substrate including:
a central anchor, positioned in the third window, said elastic anchorage elements coupling to said inertial mass to the central anchor in the third window, and extending along said first axis of rotation, said inertial mass having a distribution of mass asymmetrical with respect to said first axis of rotation and being constrained eccentrically to said substrate.

19. The apparatus according to claim 17 wherein said second window faces outside of said inertial mass.

20. The apparatus according to claim 17 wherein said first resonator element and said second resonator element are positioned symmetrically with respect to said first axis of rotation, said second axis of rotation and said third axis of rotation being positioned at an equal distance from said first axis of rotation.

21. A resonant accelerometer, comprising:
a substrate;
a mass overlying the substrate, the mass being configured to rotate about a first axis, the mass having:
a first end;
a second end opposite to the first end;
a first opening extending through the first end; and
a second opening;
a first resonator element elastically coupled to the mass and positioned in the first opening, the first resonator element being configured to rotate about a second axis;
a second resonator element elastically coupled to the mass and positioned in the second opening, the second resonator element being configured to rotate about a third axis.

22. The resonator accelerometer of claim 21, further comprising a pillar on the substrate, the pillar being positioned between the first and second resonator elements, the mass being elastically coupled to the pillar.

23. The resonator accelerometer of claim 21, wherein the second opening is enclosed within the mass.

24. The resonator accelerometer of claim 21, wherein the second opening extends through the second end.

25. The resonator accelerometer of claim 21, further comprising:
an electrode on the substrate and overlapping the first resonator;
an electric track formed on the substrate and coupled to the electrode, the electric track aligned with the first opening.

* * * * *